United States Patent [19]

Spiel et al.

[11] Patent Number: 4,680,190
[45] Date of Patent: * Jul. 14, 1987

[54] DATE PROCESSING METHOD

[75] Inventors: Albert Spiel, Yonkers, N.Y.; Henry C. Spanier, West Milford, N.J.

[73] Assignee: Nabisco Brands, Parsippany, N.J.

[*] Notice: The portion of the term of this patent subsequent to Mar. 25, 2003 has been disclaimed.

[21] Appl. No.: 898,777

[22] Filed: Aug. 19, 1986

Related U.S. Application Data

[63] Continuation of Ser. No. 732,738, May 10, 1985, abandoned, which is a continuation-in-part of Ser. No. 544,182, Oct. 21, 1983, Pat. No. 4,578,275.

[51] Int. Cl.$^4$ ............................................. A23L 1/212
[52] U.S. Cl. .................................... 426/302; 426/510; 426/640
[58] Field of Search ................. 426/302, 307, 89, 102, 426/103, 615, 639, 640, 510

[56] References Cited

U.S. PATENT DOCUMENTS

| | | |
|---|---|---|
| 208,744 | 10/1878 | Lane . |
| 534,368 | 2/1895 | Hughes . |
| 1,253,045 | 1/1918 | Katzprowsky . |
| 1,307,691 | 6/1919 | Northrup . |
| 1,374,160 | 4/1921 | Fowler . |
| 1,534,050 | 4/1925 | Barrielle . |
| 1,539,309 | 5/1925 | Goldman . |
| 1,550,321 | 8/1925 | Nichols et al. . |
| 1,631,974 | 6/1927 | McLaughlin . |
| 1,678,046 | 7/1928 | Holmes . |
| 1,853,152 | 4/1932 | Segur et al. . |
| 1,886,931 | 8/1933 | Alexander . |
| 1,980,013 | 8/1934 | Stott . |
| 2,005,184 | 4/1935 | Forrest . |
| 2,066,574 | 2/1931 | Pilorz et al. . |
| 2,072,309 | 3/1937 | Love . |
| 2,128,919 | 9/1938 | Doyle . |
| 2,192,041 | 2/1940 | Headland . |
| 2,209,889 | 7/1940 | Lachman . |
| 2,278,463 | 9/1943 | Musher ............................... 426/447 |
| 2,411,896 | 12/1946 | Richmond et al. . |
| 2,591,213 | 4/1952 | Stupin . |
| 2,624,676 | 1/1953 | Mako . |
| 2,654,734 | 10/1954 | Skinner . |
| 2,689,182 | 9/1955 | Richert ............................... 426/615 |
| 2,834,681 | 5/1958 | Kreager . |
| 2,976,159 | 3/1961 | Swisher . |
| 3,052,550 | 9/1962 | Maier ..................................... 99/100 |
| 3,057,739 | 10/1962 | Forkner . |
| 3,086,868 | 4/1963 | Keifer . |
| 3,356,512 | 12/1967 | Lemaire et al. . |
| 3,365,309 | 1/1968 | Pader et al. . |
| 3,368,909 | 2/1968 | Moore . |
| 3,425,848 | 2/1969 | Camirand . |
| 3,510,313 | 5/1970 | Steinkraus et al. . |
| 3,800,049 | 3/1974 | Larroche et al. . |
| 3,931,434 | 1/1976 | Murai . |
| 3,984,580 | 10/1976 | Gur-Arieh et al. . |
| 4,041,184 | 8/1977 | Bonacina . |
| 4,350,711 | 9/1982 | Kahn et al. ......................... 426/102 |
| 4,361,589 | 11/1982 | Wauters et al. . |
| 4,364,968 | 12/1982 | Waitman et al. . |
| 4,578,275 | 3/1986 | Spanier ............................... 426/640 |

FOREIGN PATENT DOCUMENTS 931866 11/1947 France .

OTHER PUBLICATIONS

Rygg, G. L. Date Growers Institute Report, 34, (1957), pp. 12 and 13.
Maier, V. P., et al., Date Growers Institut Report, 38, (1961), pp. 6 to 9.
Rygg, G. L. Date Growers Institut Report 33, (1956), pp. 8 to 11.
Maier, V. P., et al., Date Growers Institute Report, 41, (1964), pp. 8 and 9.
Encyclopedia of Food Technology, (1974), pp. 130 to 139, 247 to 253, 280 and 281.
Heath, Henry B., Source Book of Flavors, (1981), pp. 188 and 653.
Riaz-Ur-Rahman et al., The Punjab Fruit Journal, vol. 19, "Relative Amounts of Sugars and Their Relation to the Flesh Portion in Some Date Varieties of the Punjab", (1955), pp. 26 to 29.
Patterson, Kenneth, "Marketing the Algerian and Tunisian Deglet Noor Date Crop", pp. 10 and 11.
Fattah, M. T., et al., "Factors Affecting the Composition of Dates", Plant Physiology, vol. 2, (1927), pp. 349 to 355.
Cavell, A. J., "Basra Dates, Relationship Between Ripening and Sugar Content of Twelve Varieties", J.S.C.I., 66, (Jun. 1947), pp. 195 to 198 & 286-292.
Cook, James A., et al., "Kinds and Relative Amounts of Sugar and Their Relation to Texture in Some American-Grown Date Varieties", Am. Soc. Hortic. Sci., pp. 286 to 292.

List continued on next page.

*Primary Examiner*—Raymond N. Jones
*Assistant Examiner*—Marianne M. Cintins
*Attorney, Agent, or Firm*—Richard Kornutik

[57] ABSTRACT

Process for treating relatively light-colored dates grown domestically to impart thereto the relatively darker appearance, the flavor, the soft-chewy texture and the shelf-stability of imported dates grown in the Middle East region. The process involves steaming domestic dates at a temperature of at least 175° F. and for a period of time which is sufficient to darken the domestic dates throughout to substantially the same darkness as that of imparted dates. The steamed domestic dates are then dried to provide shelf-stable, treated dates. At no time before or during the process is a liquefied composition containing water and an effective amount of at least one saccharide sugar sweetening agent applied to or contacted with the domestic dates. The size and shape of the shelf-stable, treated dates are substantially the same as the size and shape of the starting domestic dates. Domestic dates are generally of the sucrose-type dates, whereas the imported dates are generally of the inverted-sugar type dates.

6 Claims, No Drawings

OTHER PUBLICATIONS

United States Standards for Grades of Dates, U.S.D.A., (1955).

Maier, V. P., et al., "Studies on Domestic Dates, II, Some Chemical Changes Associated with Deterioration", pp. 322 to 328.

Stewart, Earl D., "Growing and Packing Dates in California and Arizonia", Food Industries, (Sep. 1931), pp. 392 to 395.

DeMan, John M., "Principles of Food Chemistry", The AVI Pub. Co., (1980), pp. 189 to 226.

DATE PROCESSING METHOD

RELATED APPLICATION

This application is a continuation of application Ser. No. 732,738, filed May 10, 1985, now abandoned, which is continuation-in-part of commonly-owned, co pending application Ser. No. 544,182, filed on Oct. 21, 1983, now U.S. Pat. No. 4,578,275.

BACKGROUND OF THE INVENTION

1. Field Of The Invention

The invention relates to a process for treating domestically-grown dates to obtain a processed date having the characteristics of Middle Eastern imported dates. The invention also relates to dates treated by the process.

2. Prior Art

Dates are grown on date palms, Phoenix dactylifera L., over a wide expanse of the semitropical middle latitudes of the eastern and western hemispheres. Dates have been used as a staple food for many years. They are of high energy value and are comprised of approximately two-thirds sugar. The date is a sticky one-seeded fruit or berry, usually oblong in shape, which varies much in shape, size, color, quality and consistency of flesh, according to the variety and the conditions of culture. The variety usually grown in California and Arizona is the Deglet Noor, a semisoft fruit with a non-sticky skin. The fruits are light brown in color but darken on storage. The dates grown in the Middle East are darker than the dates grown in the western United States. The commercial product is dehydrated, usually at a low temperature, to retain maximum flavor quality. The dried fruit is over one half sugar by weight (usually 70 to 80 percent) and contains about 2 percent each of protein, fat and mineral matter. Dates contain a high percentage of sugar either as invert or as sucrose, the level of which is maximum just before ripening. In the dry varieties such as Deglet Noor, the sugar is mostly sucrose, while the moist varieties contain invert sugar (glucose and fructose).

Maier, V.P., et al., "Studies on Domestic Dates, II. Some Chemical Changes Associated with Deterioration", pp. 322 to 328, reports that sucrose inversion, the result of invertase action, can be prevented by a mild heat treatment.

Imported dates have a darker appearance, different flavor, and a softer, chewier bite than that of U.S. domestic dates. The domestic dates have a more fibrous, tougher chew and contain more rag than imported dates. Additionally, imported dates are lower in moisture content than domestic dates and can be packaged without drying to obtain a shelf-stable product. Controlled drying is necessary to obtain a shelf-stable domestic date. A desirable characteristic of domestic dates is their uniform size and shape. The shape is retained during packaging, whereas imported dates are typically squashed upon packaging into a box. Domestic dates can basically be described as being lighter in color, less sweet, less flavorful (more fruity), and higher in moisture (therefore of borderline shelf stability at room temperature) than imported dates while domestic dates have a fibrous-type or firm texture. They are also more uniform in size and shape than imported dates.

Imported dates contain nearly all invert sugar, whereas the domestic dates contain relatively high levels of sucrose with small amounts of invert sugar. Treatment of domestic dates with enzymes to convert the sucrose into invert sugars would be uneconomical.

The nonenzymatic browning reactions are heat-induced dehydration, degradation, and condensation reactions which are accompanied with the development of yellow to brown color, and characteristic flavor. Nonenzymatic browning is usually either a caramelization or a Maillard reaction.

Johnson et al., "Encyclopedia Of Food Technology", The AVI Publishing Co., (1974), at p. 138, reports that at varying water concentrations, the browning reactions are qualitatively different. At relatively high temperatures, dehydration of the sugar itself will supply the moisture to accelerate the reaction. At lower temperatures, the air humidity is an important factor. At a given temperature, increasing the water concentration will accelerate browning until, by virtue of dilution of reactants, the rate decreases. The optimum water concentration for browning seems to be about 30 percent. The reference, at page 139, also reports that the processing and storage of susceptible products at the lowest possible temperature aids in preventing browning. Adjustment of the moisture content, either to low moisture in some cases, or to dilute solutions in others, may inhibit browning. At times, lowering the pH of the system may effectively inhibit browning during processing, after which the pH can be readjusted to the desired value.

The natural tannins of dates and the enzymatic and Maillard browning which take place during normal storage impart a brown color and a somewhat caramelized flavor. At 140° F. or so a reddish-brown color as well as astringency and off-flavors occur in Deglet Noor dates. Maier et al., "Effects of heat processing on the properties of dates", Date Growers Inst. Rept., 41, (1964), pages 8 to 9. Heat processing coupled with moisture control can be used to improve the color, texture and general quantity of Deglet Noor dates, but again attempts to accelerate the process by use of temperatures in excess of 140° F. may result in the development of off-flavors, off-colors and astringency. Deglet Noor dates are usually light brown in color. Page 8 of the reference reports that dark brown dates are considered to be undesirable. Page 9 of the reference reports that tough dates have invert sugar contents of 25 to 35 percent (dry weight basis), whereas tender dates have invert sugar contents above that.

U.S. Pat. No. 3,052,550 (Maier) teaches adjusting the moisture level of dates to a level of 26 to 32 percent. Then the dates are held in an atmosphere having a 70 to 80 percent relative humidity and a temperature of 130° to 140° F. until the majority of the sucrose in the date is converted to invert sugar. The moisture adjustment can be accomplished in any of the conventional ways, e.g., immersion in water under vacuum or exposure to a humid atmosphere. The use of steam is not disclosed by the patent. The patent states that the high-moisture content dates have a softer texture, a darkened color and increased storage stability. The sucrose in the dates is inverted to a considerable degree by the patent process. The high-moisture content dates have a lower equilibrium relative humidity than untreated dates. The high-moisture content dates can then be dried to below 23 percent moisture content (usually 18 to 22 percent) to prevent mold growth. If the dates are not so dried, a preservative is preferably added during the treatment process.

U.S. Pat. No. 2,591,213 (Stupin et al.) discloses subjecting dried dates to water vapor at 140° to 155° F., and further teaches that it is undesirable to exceed these temperatures (col. 1, lines 40 to 48) or else caramelization will occur in the dates. U.S. Pat. No. 2,689,182 (Richert) teaches that it is old to steam dates which have become excessively dry, and further states that high temperatures cause excessive darkening (col. 1, lines 32 to 37 and 52 to 54). Accordingly, U.S. Pat. No. 3,052,550 (Maier) is limited to an upper hydration temperature limit of 140° F., (or at most 155° F.). U.S. Pat. No. 3,052,550 (Maier) teaches adjusting the moisture level of dates to a level of 26 to 32 percent. The moisture adjustment can be accomplished in any of the conventional ways, e.g., immersion in water under vacuum or exposure to a humid atmosphere. The use of steam is not taught. Then the dates are held in an atmosphere having a 70 to 80 percent relative humidity and a temperature of 130° to 140° F. until the majority of the sucrose in the date is converted to invert sugar. U.S. Pat. No. 3,052,550 (Maier) is limited to the use of an upper temperature of no more than about 155° F. in its date hydration step.

Maier et al. "Sucrose Inversion In Deglet Noor Dates And Its Processing Applications", Report Of Thirty-Eighth Annual Date Growers' Institute, (Apr. 29, 1961), pages 6 to 9, states:

"To bring about inversion in a reasonable length of time the following general procedure is suggested:
1. Hydrate dates to at least 26% moisture
2. Treat with a preservative to prevent microbial growth
3. Hold at 130°–150° F. for the length of time required to bring about the desired amount of inversion (see the following calculations)
4. Dehydrate to desired final moisture content." [p. 8]

"It is apparent that temperatures in the vicinity of 140° F. are required to invert sucrose in dates rapidly enough to be considered industrially practical. *The use of higher temperatures is probably possible, but undesirable changes may be more pronounced.*" [Emphasis supplied] [p. 8]

The teaching of the reference does not go above about 150° F. The reference probably involves the same process as U.S. Pat. No. 3,052,550 (Maier) which was filed on Aug. 25, 1961, and issued on Sept. 4, 1962. U.S Pat. No. 3,052,550 states:

"Invertase is present naturally in Deglet Noor dates, but it is relatively inactive at low moistures. If sucrose is to be converted into invert sugar in a reasonable length of time, the fruit should be brought to a high moisture content in order to reactivate the invertase sufficiently." [p. 8]

Maier et al., "Effects Of Heat Processing On The Properties Of Dates", Report Of Forty-First Annual Date Growers' Institute, (Apr. 25, 1964), pages 8 and 9, further cautions against going above 140° F. The reference states:

"Heat processing coupled with moisture control can be used to improve the color, texture and general quality of Deglet Noor dates, *but attempts to accelerate the process by use of temperatures in excess of 140° F. may result in the development of off-flavors, off-colors and astringency.*" [Emphasis supplied] [p. 9]

See also the last paragraph in page 8 of the reference. Johnson et al., "Encyclopedia Of Food Technology, (1974), on page 281, cited the above reference for the same temperature effect teaching.

Maier et al., "Studies On Domestic Dates II. Some Chemical Changes Associated With Deterioration", pages 322 to 328, reports some of the chemical chages, and their physical results, in Deglet Noor dates occuring during storage at 49° C. (about 121° F.). Caramelization is generally a relatively high-temperature chemical change in the dates which results in flavor and color changes in the date skin and flesh. U.S. Pat. No. 2,591,213 (Stupin et al.) teaches that the undesirable caramelization of relatively-dry dates (as indicated by the redness in the fleshy part of the date) occurs when the dates are subjected to water vapor at a temperature of 150° F. or higher.

U.S. Pat. No. 3,365,309 (Pader et al.) teaches that fruits should not be subjected to high temperature processing as it substantially destroys or weakens tissue structures.

BROAD DESCRIPTION OF THE INVENTION

An object of the invention is to provide a process for treating domestically-grown dates to impart to them the darker appearance, the flavor, the soft, chewy texture and the shelf-stability of dates grown in the Middle Eastern regions while retaining the size and shape of domestic dates. Another object is to provide treated domestic dates which have the darker appearance, the flavor, the soft, chewy texture and the shelf-stability of Middle East dates and have retained the size and shape of domestic dates. Other objects and advantages of the invention are set out herein or are obvious herefrom to one ordinarily skilled in the art.

The objects and advantages of the invention are achieved by the process and product of the invention.

The invention involves a process for treating relatively-light colored, sucrose-type dates grown domestically to impart thereto the relatively darker appearance, the flavor, the soft-chewy texture and the shelf-stability of imported invert sugar-type dates grown in the Middle East region. The process includes steaming the domestic dates at a temperature of at least 175° F. for a period of time which is sufficient to darken the domestic dates throughout to substantially the same darkness as that of imported dates. Preferably a temperature of at least 212° F. is used during the steaming step, but hot moist air having a temperature of at least 175° F. can be used. When steam is injected into an autoclave or other container, the steam may conclude upon the dates or be diluted by air—in either case, the temperature will be below 212° F. The steamed domestic dates are dried to provide shelf-stable, treated dates. The size and shape of the shelf-stable, treated dates are substantially the same as the size and shape of the starting domestic dates.

Typically, the dates before steaming have a moisture content of 22 percent, after steaming have a moisture content of 26 percent and after drying have a moisture content of 18 percent.

In the invention, the domestic dates are not contacted or coated, before or during the invention process, with a liquefied composition containing any saccharide sugar sweetening agent or containing water and an effective amount of at least one saccharide sugar sweetening agent.

The off-flavors and astringency which occur in sucrose-type of dates, such as, the Deglet Noor variety, at about 140° F. are avoided or eliminated by the invention process. The domestic dates treated by the invention process do not have any astringency or off-flavors. The key to overcoming the prior art problems and disadvantages is the steaming of the dates followed by drying, which imparts the desired properties and excellent shelf life.

The invention process improves and/or alters the flavor, texture, color and stability of domestic dates, and allows the use of domestic dates in place of imported dates. The steps of the invention process are each integral in favorably improving and/or altering the flavor, texture, color and/or stability of the domestic dates. The distinct product identity of imported dates is their darker appearance (color). The invention method darkens the appearance of the domestic date not only on the surface but throughout the date. The moisture and moist heat greatly speed up the rate of darkening of domestic dates. Another key distinction between domestic and imported dates is their texture. The softer, pliable texture achieved by the invention process in domestic dates closely resembles the texture of imported dates.

The flavor becomes more caramel-like; the darker color is more acceptable by consumers than the pale yellow brown color of domestic dates; the texture becomes softer and more chewy. The treated domestic dates do not have any loss in aroma or taste. The treated dates do not have any disagreeable odors or off-flavors. The treated dates have a well-developed date taste and flavor.

One possible theory of at least part of the mechanism of the invention is that, during steaming, the cell walls of the date rupture.

In copending, commonly-assigned application Ser. No. 544,182, entitled "Date Processing", filed on Oct. 21, 1983, domestic dates are sprayed with a flavoring sugar solution, steamed and dried to obtain processed dates. One possible theory of at least part of the mechanism of such prior invention is that part of the applied sugar infused into the interior of the dates (and possibly into some of the cells of the dates). The steaming, heat and sugar then act on and in the dates. Apparently the additional sugar infused into the dates by the steam allows some invert sugar to be formed (or added), prevents the formation of undesirable off-flavors and the like, allows controlled browning to occur and allows the formation of a soft, chewy texture. The additional sugar by infusion and on the surface apparently prevents shrinkage, distortion or expansion from the original size of the dates. That is, the infused sugar may also maintain cell wall integrity (prevent cell wall collapse) during drying so that the dried, treated dates retain the size and shape of the original dates. The pertinent parts of U.S. Ser. No. 544,182 (filed on Oct. 21, 1983) are enclosed herein by reference.

The main purpose of the invention process is to convert domestic dates to snacking dates having improved stability. Domestic dates have high sucrose levels and drying of them causes crystallization of the sucrose. The invention steaming step provides the required moisture and heat (preferably in a sealed container so that there is no drying during the steaming step). The invention drying step then can provide dried dates without any significant amount of crystallization of the sucrose. The invention-treated dates have improved stability and color and have no desirable toughness.

In the process of the invention the domestic dates are steamed and dried to obtain a processed date having the darker color, the flavor, the soft, chewy texture, and the shelf-stability of imported dates while retaining the uniform size and shape of the domestic date. The darkening of the domestic date is a function of the temperature, moisture content of the atmosphere and time of processing. Steam treatment is essential to the results obtained by the invention; dry heat treatment does not provide such unexpected results. Dry heat treatment, in place of the invention steam treatment, tends to dehydrate the dates which does not provide the optimum conditions to prevent off-flavors, etc., and to provide controlled sugar inversion and controlled browning. The sequence of steaming followed by drying is critical. To first steam the dates when seeking a dried date product goes against conventional logic. The drying may induce enzymatic action.

The invention also involves shelf-stable dates which comprise dried, domestically-grown dates treated so as to have the relatively darker appearance, the flavor, the soft-chewy texture and the shelf-stability of dates in the semi-tropical regions of the Eastern Hemisphere. The treated domestically-grown dates retain substantially the size and shape of untreated domestically-grown dates. Preferably the domestic dates are of the Deglet Noor variety.

The invention further involves shelf-stable dates which are composed of dried, domestically-grown, sugar-type dates treated so as to have the relatively darker appearance, the flavor, the soft-chewy texture and the shelf-stability of invert sugar-type dates grown in the Middle East region. The treated-domestic dates retain substantially the size and shape of untreated domestic dates. Preferably the domestic dates are of the Deglet Noor variety.

The invention dates are stable against spoilage by microorganisms and by enzymatic action. The invention dates do not have to be stored at temperatures below room temperature, but of course cold storage increases their shelf life. The invention dates in air-tight package form are shelf stable for as long as 1 to 2 years at room temperature. The dried, treated dates of the invention can be used in foodstuffs, such as, date nut bread, cakes (including mixes), pies, icings, cookies (including mixes), fruit cakes, puddings, yogurts, donuts, ice creams, pancake batters, cream-type products, pie and donut fillings, flour-based batters, non-dairy creamers, pie crusts, corn flakes, bran flakes, rice cereal, and other baked goods, breakfast cereals and confectionary goods.

Textural modification is basically the result that accompanies stability, flavor and color development in domestic dates by the invention process. The textural modification takes the form of the development of a softer, pliable, less fibrous bite in domestic dates. This is a desirable feature found in imported dates.

DETAILED DESCRIPTION OF THE INVENTION

As used herein, all parts, percentages, ratios and proportions are on a weight basis unless otherwise stated herein or otherwise obvious herefrom to one ordinarily skilled in the art.

The domestic dates treated by the invention are generally termed sucrose-type dates because such date varieties contain sucrose as the principal sugar. The preferred variety of domestic date is Deglet Noor, but other suitable varieties of domestic dates include Kirta, Thuuri and Deglet Beidha. The imported Middle East dates are generally characterized by having invert sugar as the principal sugar.

The domestic dates generally are light colored and translucent. The imported dates generally are considerably darker. Usually the darker color has been avoided in domestic dates because of lack of consumer appeal. The invention affects the color of the domestic heat by steam treatment to provide a darker appearance. The steaming and subsequent drying provide the flavor of the imported dates without any off-flavors, etc.

During the ripening of dates, there appears to be a conversion of sucrose to invert sugars. The growing season is several weeks shorter in the United States than in the Middle East. It is believed that this is the reason why domestically grown dates have a high sucrose content, as is the case with domestically-grown dates of the Deglet Noor variety. During the maturing or ripening process the flesh around the date seed is hydrolyzed to sugars and part of the sucrose present is hydrolyzed to invert sugar. Enzymatic conversion of the sucrose would not be economical.

Soft date varieties grown in the United States apparently contain little or no sucrose, whereas the semi-dry varieties grown domestically contain significant to very high levels of sucrose. Typical semi-dry varieties grown domestically are Dayri, Deglet Noor, Troma and Zahidi. Generally, varieties that are high in sucrose are firm, whereas varieties with relatively large amounts of invert sugar are soft. The invention process imparts a soft texture to the domestic dates, which normally have a fibrous tough chew.

Imported dates are shelf stable, but the domestic dates are not shelf stable due to a high moisture content and other factors. The controlled drying of the U.S. or domestic dates helps provide more shelf stability.

The invention process imparts the color, flavor, texture and shelf-stability characteristics of imported dates to domestic dates while retaining the favorable characteristic of uniform size and shape of the domestic date. The invention dates are soft but do not squish when pressed between the fingers.

The Maillard reaction or nonenzymatic browning is a complex of reactions involving the sugar and protein that occurs from limited heating. Apparently the most significant reactions involve amines (protein and amino acids) interacting with sugars to produce brown, polymeric pigments, and low-molecular weight ultraviolet absorbing compounds including various flavor and aroma constituents. The browning reaction is known to be affected by temperature, pH, moisture level and other factors. It is also known that foods rich in reducing sugars are very subject to the browning reaction - sucrose is not a reducing sugar. It is further known that the browning reaction rate is generally high in foods having a low water content.

Increased temperature, particularly at high sugar concentrations, generally rapidly increases the rate of browning. (The dates should not be microwaved before or during the invention process as the microwaved dates are harder, drier and grittier than invention-treated dates.)

In general, the browning reaction is known to be slowed down by increasing pH. The effect of pH on the browning reaction is known to be highly dependent on moisture content. It is known that when a large amount of water is present, most of the browning is caused by caramelization, but at low water levels and at pH greater than 6, the Maillard reaction is predominant.

The invention process uses the non-enzymatic browning of dates to advantage. Nonreducing disaccharides, such as, sucrose, only react in the non-enzymatic browning reaction after hydrolysis of them has taken place. In this manner it is easier to control the color change by the use of sucrose.

Caramelization is generally a relatively high temperature chemical phenomena in the dates which causes changes in the flavor and color of the date skin and flesh. The steaming of the invention unexpectedly prevents or compensates for any undesirable flavor changes in the date due to any caramelization. The adding of a date flavoring agent also helps to mask any undesirable flavor changes in the dates due to any caramelization. A darker date appearance is sought by the invention.

The formation of the caramel pigment can be considered as a non-enzymatic browning reaction in the absence of nitrogenous compounds. When sugars are heated in concentrated solution, a series of reactions occur which finally leads to caramel formation. It is known that the caramelization of sucrose requires a temperature of about 200° C. At 160° C. sucrose melts and forms glucose and fructose anhydride. At 200° C. the reaction sequence consists of three distinct stages well separated in time. Accordingly it is believed that caramelization at most plays a minor role in the invention process.

A natural flavoring agent, which does not contain any saccharide sugar sweetening agent, can be applied to the dates before steaming. The preferred natural flavoring agent is natural date extract, caramel flavor, butterscotch flavors, can be used. The flavoring agent cannot be saccharide sugar sweetening agent, such as, sucrose and/or honey. Preferably the flavorant agent in an amount composing 1 to 10 weight percent of the dates can be applied to the dates before steaming.

Any suitable application method can be used to apply the flavorant to the dates, but preferably an aqueous solution of the flavorant is sprayed onto the dates. Other suitable application methods include immersing or dipping the dates in aqueous solutions of the flavorant.

A coloring agent in an amount of 1 to 5 weight percent of the dates can be applied to the dates before steaming, but such is not a preferred feature of the invention.

The dates are preferably not treated with sodium hydroxide solution or other alkaline solution treatment in an effort to darken the color of the dates.

The steamed dates are preferably dried in a forced air oven at a temperature of 220° to 260° F., preferably at 240° F., for a period of 30 minutes to 1 hour, preferably about 45 minutes. While steam is used, in a practical sense, the resultant moist atmosphere can have a slightly lower temperature (that is, down to 175° F.). The treated dates can be dried in any suitable manner, such as, sun drying, freeze-drying, vacuum drying, dielectric oven conditioning, air drying, air-oven drying, etc. Preferably the dates are dried to a moisture content below 23 percent so that a preservative does not have to be used. Normally the dates are dried to a moisture content of about 18 to 22 percent if they are to be sold for consumption as such. Moisture levels as low as 6 to 10 percent are achieved if the dates are to be used in breakfast foods, such as, cereal products, specifically corn flakes.

The following table sets out the sugar analysis of imported and Deglet Noor dates:

| CONDITION OF THE DATES | TOTAL SUGAR, PERCENT | SUCROSE, PERCENT | REDUCING SUGAR, PERCENT | REDUCING SUGAR ON TOTAL SUGAR BASIS, PERCENT |
|---|---|---|---|---|
| Untreated | 65.0 | 30.0 | 35.0 | 54 |
| Imported dates | 70.0 | — | 70.0 | 100 |

Invert sugar contributes to the flavor, and favorably affects the shelf stability, textural mouthfeel, and color development of the dates. Sucrose is the primary sugar of domestic dates, fructose sugar (invert sugar) is the primary sugar of imported dates.

A shelf stable converted date is achieved when the water activity is lower than 0.68—this state or condition has been accomplished with the dates processed by the method of the invention. Water activity is broadly defined as the ratio of the moisture content of the product (date) to the relative humidity of the air surrounding it. The relative humidity corresponding to each specific moisture content of the product (date) is called equilibrium relative humidity. The following relationship more specifically defining water activity applies:

$$a = p/p_o = ERH/100$$

wherein:
a = water activity
p = partial pressure of water in the food (date)
$p_o$ = vapor pressure of water at same temperature
ERH = equilibrium relative humidity in percent A water activity of 0.68 or less is necessary to achieve a shelf stable date product. Domestic dates, as received from the suppliers, are usually higher than such value. The invention procedure reduces the water activity level of the dates to less than 0.68.

The dried dates are packaged for consumption as such or used in preparing a food stuff.

By way of summary, the invention involves a process which includes steaming domestic dates atmospherically and then drying them to obtain a shelf-stable processed date having the color, flavor, texture and shelf-stability characteristics of imported dates while retaining the uniform size and shape of the domestic date.

EXAMPLE 1

Domestic dates (of the Deglet Noor variety) were placed in an autoclave and steamed at atmospheric pressure for about one hour. (The steaming can be accomplished using shorter processing times, e.g., about 15 minutes.) The steamed product was dried in a forced air oven at a temperature of about 240° F. for 45 minutes to obtain a shelf-stable processed date. The hot air had a low moisture content. The dried domestic dates had the color, appearance, texture and flavor of imported dates and retained their original shape and size. The dried dates were placed in moisture proof bags and stored at room temperature.

EXAMPLE 2

Domestic dates (of the Deglet Noor variety) were pitted and pasteurized. The moisture content of the dates was about 22 percent. The flavored dates were steamed in a steam tunnel for 1 hour at a steam temperature of 240° to 250° F. The moisture content of the dates after steaming was 26 percent. The steamed dates were dried in a forced air dryer to a moisture content of about 18 to 19 percent. The drying air was at 240° to 250° F. and the drying time was about 45 minutes. The dried dates were cooled in a cooler such that the temperature of the center of the dates was about 80° F. The cooled dates were then packaged in containers.

EXAMPLE 3

500 grams of domestic dates (21.8 percent water) were steamed in boxes for 1 hour (retort). The steamed dates had a moisture content of 25.8 percent. The steamed dates were dried in open boxes in a forced air oven at 240° F. After 30 minutes of drying, the dates had an equilibrium relative humidity (ERH) of 67.5 percent and a water content of 19.24 percent. After 45 minutes of drying, the dates had an ERH of 66.3 percent and a moisture content of 17.73 percent. The 45 minute drying period provides the best balance of water activity and economics. After 60 minutes of drying, the dates had an ERH of 62.0 percent. The dates were cooled on screens to room temperature. The invention-treated (converted) domestic dates had a nice appearance, were sweet and had a flavor that was somewhat pruny with a touch of honey. The invention-treated domestic dates were more intact and less deteriorated looking than domestic dates.

EXAMPLE 4

500 grams of domestic dates (21.8 percent water) were steamed in boxes for 1 hour (retort). The steamed dates had a moisture content of 25.8 percent. The steamed dates were dried in open boxes in a forced air oven at 240° F. After 30 minutes of drying, the dates had an equilibrium relative humidity (ERH) of 67.5 percent and a water content of 19.29 percent. After 45 minutes of drying, the dates had an ERH of 64.6 percent and a moisture content of 17.73 percent. The 45 minute drying period provides the best balance of water activity and economics. The dates were cooled on screens to room temperature. The invention-treated (converted) domestic dates had a nice appearance, were sweet and had a flavor that was somewhat pruny with a touch of honey. Also, the invention-treated domestic dates were sticky, yet easy to handle and chop. The invention-treated domestic dates were more intact and less deteriorated looking than domestic dates.

EXAMPLE 5

Pitted domestic dates were steamed under atmospheric conditions for approximately 1 hour, during which time a desirable color developed. The pitted domestic dates had been preconditioned in a dielectric oven before the subsequent exposure to steam heat. The steam injection accelerated the color development of the dates. Such process achieved an attractive, comparably-colored domestic date when compared to the imported date.

The steam-treated domestic dates and imported dates were prepared in a date bran muffin recipe. Twenty-four taste test panelists were given written instructions that they were to evaluate the effect of the dates in the muffins. The panel was asked to evaluate appearance, flavor, texture and overall categories in a blind test. Each panelist was given ½ of a muffin having the imported dates and ½ of a muffin having the steamgreated domestic dates. There was no significant preference in the flavor, texture and overall categories, but the panel significantly preferred the appearance of the steam-treated domestic dates in muffins over the imported dates in muffins. The steam-treated domestic dates were well received by the taste panel when prepared in a date bran muffin recipe.

Treatment of pitted domestic dates with pressurized steam reduced the color development time by about 67 percent.

EXAMPLE 6

Whole domestic dates were conditioned in an open tray at 100° F. and 90 percent relative humidity. The Agtron reading dropped from an initial value of 32 to a value of 27 after 96 hours of conditioning, which means that only a slight color change occurred. The dates were moldy after 120 hours.

EXAMPLE 7

Domestic whole dates were subjected to forced air heating at 200° F. in a closed receptacle to ascertain the effect thereof on the color of the dates. As a reference point, the Agtron reading for imported dates (having a reddish-brown appearance) is 29. For the domestic dates, the Agtron reading dropped from an initial value of 39.5 to a value of 15 after 7 hours of heat treatment. The result was a good darkened color for the domestic dates after 6 to 7 hours of exposure.

The subject darkness analysis of the domestic dates went from an initial value of less than 0.1 to a value of 5 after 6 to 7 hours of exposure.

EXAMPLE 8

Various sets of domestic dates were heated at various temperatures. A relationship of heating time at various temperatures on the development of the desired color in domestic dates was observed. As the temperature increased, the time for color development decreased. Based on this established relationship, it appears that there is a direct relationship between color development and temperature-time conditions.

EXAMPLE 9

Domestic dates processed (converted) as in Example 4 were prepared in a date bran muffin recipe.

EXAMPLE 10

Domestic dates processed (converted) as in Example 4 were prepared in a date nut bar recipe.

What is claimed is:

1. Process for treating light colored, sucrose-type dates grown domestically to impart thereto the darker appearance, the flavor, the soft-chewy texture and the shelf-stability of imported invert sugar-type dates grown in the Middle East region, comprising:
    (a) steaming the domestic dates at a temperature and for a period of time which are sufficient to darken the domestic dates to substantially the same darkness as that of imported dates, said temperature being at least 175° F.; and
    (b) drying the steamed domestic dates to provide shelf-stable, treated dates, the size and shape of said shelf-stable, treated domestic dates being substantially the same as the size and shape of said starting domestic dates, said shelf-stable, treated domestic dates not having been expanded from the original size of said starting domestic dates, before or during step (a) or between steps (a) and (b) or during step (b) and no composition containing at least one saccharide sugar sweetening agent contacting or being applied to said starting domestic dates before or during step (a) or between steps (a) and (b) or during step (b).

2. Process as claimed in claim 1 wherein the domestic dates are of the Deglet Noor variety.

3. Process as claimed in claim 1 wherein steaming step (a) is conducted by using steam having super atmospheric pressure.

4. Process as claimed in claim 1 wherein steaming step (a) is conducted by using steam having atmospheric pressure.

5. Process as claimed in claim 1 wherein drying step (b) is conducted by using a temperature of 220° to 260° F.

6. Process as claimed in claim 1 wherein 1 to 10 weight percent, based on the weight of the dates before step (a), of at least one flavoring agent is placed on the dates before step (a), said flavoring agent not being or containing any saccharide sugar sweetening agent.

* * * * *